US008607227B2

(12) United States Patent
Lin et al.

(10) Patent No.: US 8,607,227 B2
(45) Date of Patent: Dec. 10, 2013

(54) ELECTRONIC DEVICE AND METHOD FOR BURNING FIRMWARE TO EMBEDDED DEVICE

(75) Inventors: Yu-Long Lin, Shenzhen (CN); Hua Dong, Shenzhen (CN); Jie-Jun Tan, Shenzhen (CN); Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 75 days.

(21) Appl. No.: 13/449,296

(22) Filed: Apr. 17, 2012

(65) Prior Publication Data
US 2012/0331280 A1    Dec. 27, 2012

(30) Foreign Application Priority Data
Jun. 24, 2011    (CN) .......................... 2011 1 0173070

(51) Int. Cl.
*G06F 9/445*    (2006.01)
(52) U.S. Cl.
USPC ......................................................... 717/178

(58) Field of Classification Search
USPC ......................................................... 717/178
See application file for complete search history.

(56) References Cited

U.S. PATENT DOCUMENTS

2007/0094489 A1* 4/2007 Ota et al. ........................... 713/2
2009/0150598 A1* 6/2009 Jung et al. ...................... 711/103
2013/0103992 A1* 4/2013 Chang et al. ................... 714/718

* cited by examiner

*Primary Examiner* — Li B Zhen
*Assistant Examiner* — Hui-Wen Lin
(74) *Attorney, Agent, or Firm* — Altis Law Group, Inc.

(57) ABSTRACT

In a method of burning a firmware to an embedded device, a booting file is firstly created and saved in the firmware. The booting file includes a boot loader, a first kernel, a second kernel, a first initrd, a second initrd of a firmware, a rootfs, and an application program. The method burns the boot loader, the first kernel, the second kernel, the first initrd, and the second initrd in a flash memory of the embedded device. When the rootfs and the application program are recorded in a storage system of the embedded device, the method downloads the rootfs and the application program from a storage system of the embedded device, and burns the rootfs and the application program to a register of the flash memory.

17 Claims, 4 Drawing Sheets

ELECTRONIC DEVICE AND METHOD FOR BURNING FIRMWARE TO EMBEDDED DEVICE

BACKGROUND

1. Technical Field

Embodiments of the present disclosure generally relate to methods of programming embedded devices, and more particularly to an electronic device, a storage medium and a method for burning a firmware to an embedded device.

2. Description of Related Art

Before an embedded device is tested, flash memory of the embedded device needs to be updated with firmware of an electronic device. In current technologies, the firmware is manually copied into the flash memory using a X-Modem, and then software is used to extract contents of the firmware that have been copied into the flash memory. The contents may include a boot loader, a kernel, an initial RAM disk Linux, and a root file system. Since capacity of the flash memory is often quite large, a manufacturer of the embedded device often allows bad blocks to be included in the flash memory. However, different bad blocks of the flash memory may be located in different positions, and if a bad block of the firmware is copied into one bad block of the flash memory, the embedded device will not be powered on. Therefore, an improved method is desirable to address the aforementioned issues.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or computer storage device.

Figure 1:
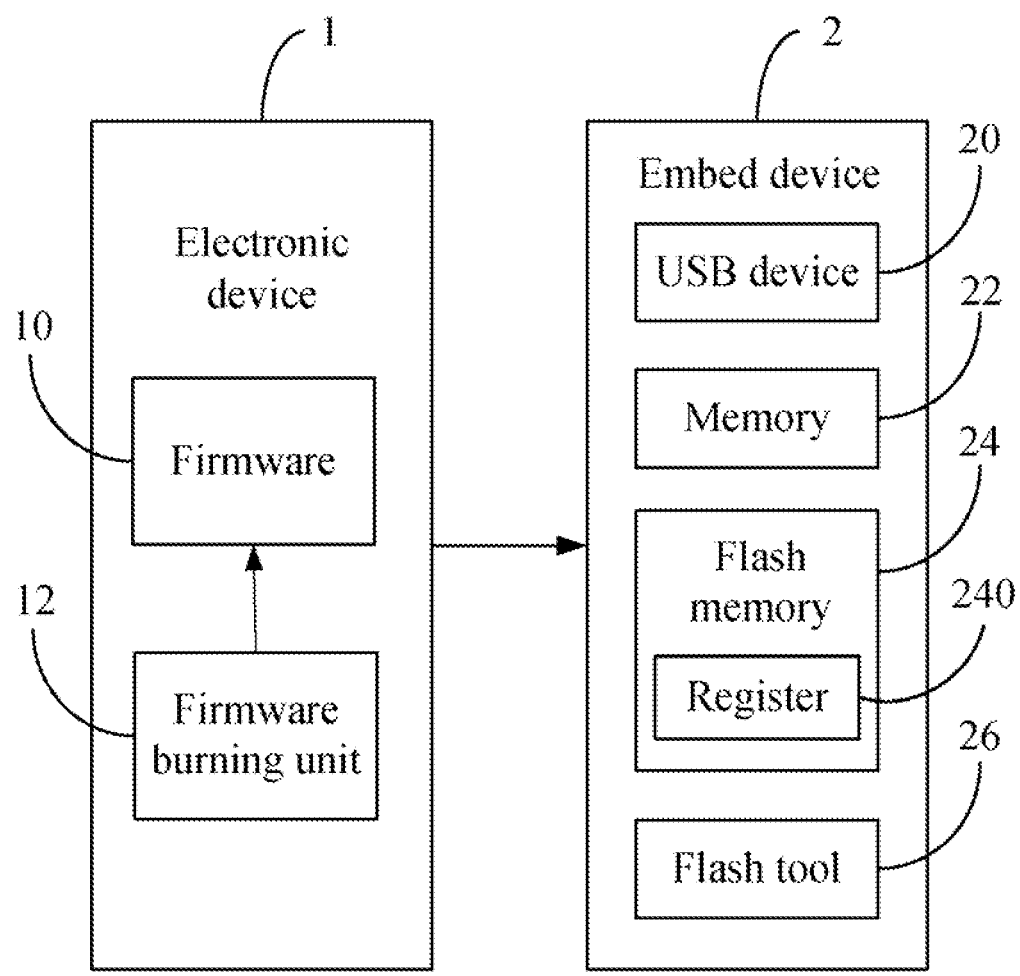
FIG. 1 is a block diagram of one embodiment of an electronic device including a firmware burning unit.
Figure 2:
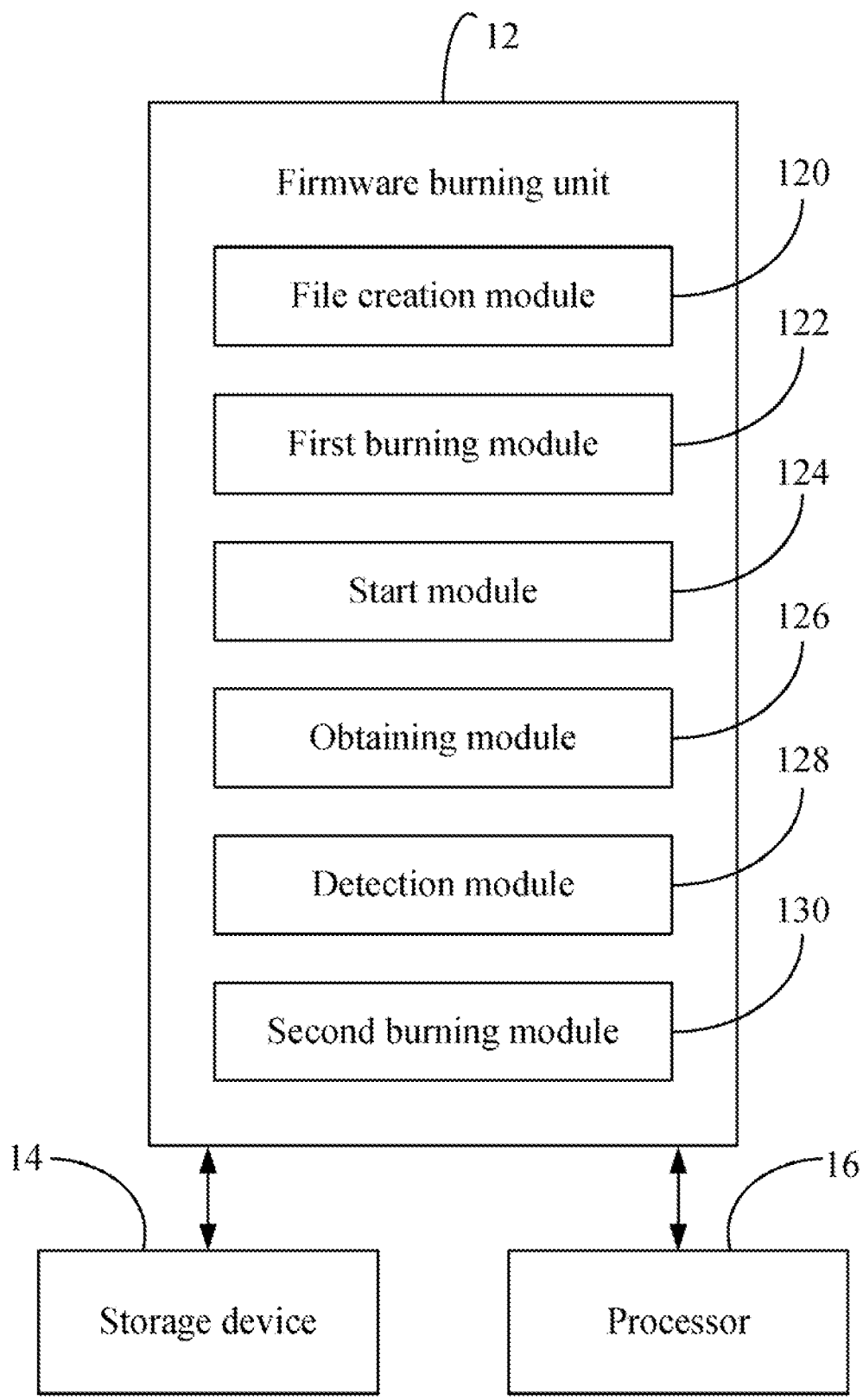
FIG. 2 is a block diagram of one embodiment of function module of the burning unit in FIG. 1.

FIG. 1 is a block diagram of one embodiment of an electronic device 1 including a firmware burning unit 12. The electronic device 1 further includes a firmware 10, a storage device 14 (as shown in FIG. 2), and at least one processor 16 (as shown in FIG. 2). The firmware 10 is a combination of hardware and software programs, such as a chipset having recorded data or programs. The firmware burning unit 12 burns the firmware 10 to an embedded device 2. As used herein, the word "burning" is defined as a process of copying, recording, or programming the firmware 10 into the embedded device 2. In one embodiment, the electronic device 1 may be a computer, a server, a portable electronic device, or any other electronic device. Functions of the burning unit 12 are implemented by the electronic device 1.

The electronic device 1 electronically connects to the embed device 2, and can burn the firmware 10 to the embedded device 2. In the embodiment, the embedded device 2 includes a universal serial bus (USB) device 20, a memory 22, a flash memory 24 and a flash tool 26. In one embodiment, the flash memory 24 is a NAND flash. The flash tool 26 is a computer program that can detect whether a current register of the flash memory 24 is enabled (i.e., a ability to read or write data).

Figure 3:
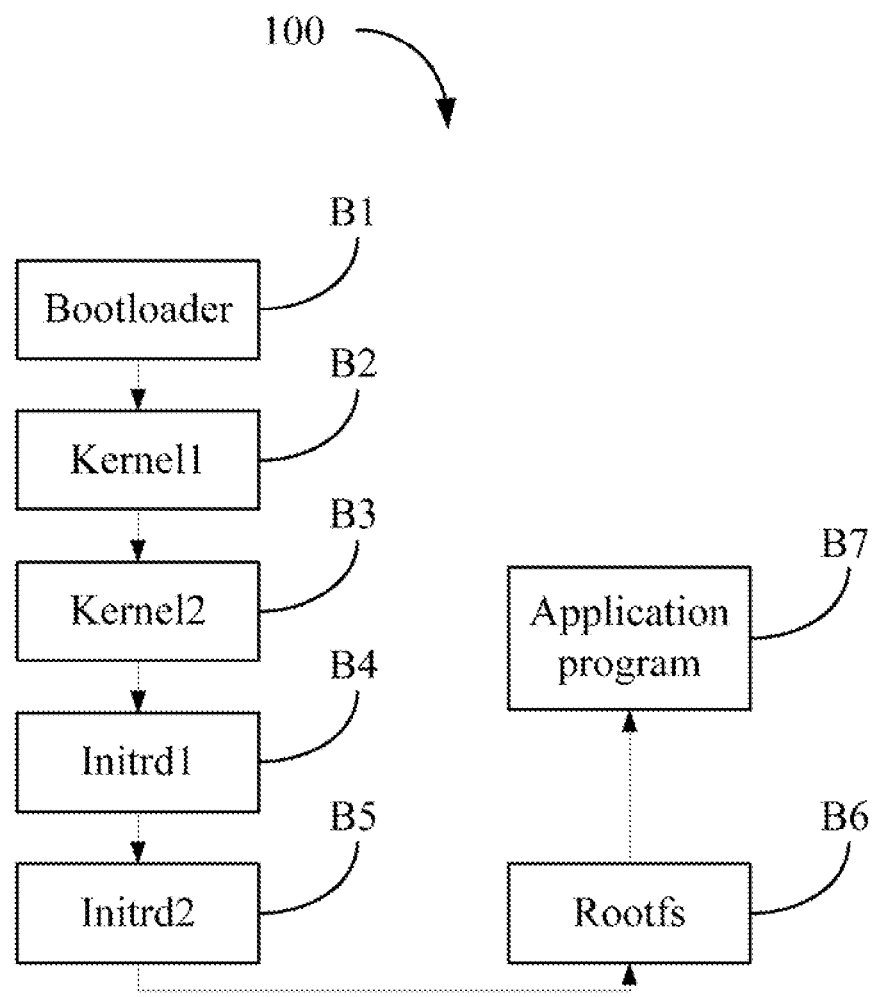
FIG. 3 illustrates an example of creating a booting file.

In order to successfully burn the firmware 10 to the embedded device 2, the firmware burning unit 12 creates a booting file 100 in advance. The booting file 100 is a virtual file that includes a software program of the firmware 10. Details of the booting file 100 are illustrated in FIG. 3.

FIG. 2 is a block diagram of one embodiment of function module of the firmware burning unit 12 in FIG. 1. In one embodiment, the firmware burning unit 12 includes a file creation module 120, a first burning module 122, a start module 124, a detection module 126, an obtaining module 128, and a second module 130. Each of the modules 120-130 may be a software program including one or more computerized instructions that are stored in the storage device 14 and executed by the processor 16 to provide functions of the electronic device 1.

In one embodiment, the storage device 14 may be a magnetic or an optical storage system, such as a hard disk drive, an optical drive, a compact disc, a digital video disc, a tape drive, or other suitable storage medium. The processor 16 may be a central processing unit including a math co-processor, for example.

The file creation module 120 creates the booting file 100, and saves the booting file 100 in the firmware 10. As shown in FIG. 3, the booting file 100 includes seven parts: a boot loader, a first kernel (hereinafter "kernel1"), a second kernel (hereinafter "kernel2"), a first initial RAM disk Linux (initrd) (hereinafter "initrd1"), a second initrd (hereinafter "initrd2"), a root file system (hereinafter "rootfs"), and an application program for testing the embedded device 2.

In the embodiment, the boot loader, the kernel1, the kernel2, the initrd1, and the initrd2 are recorded in the memory 22. The rootfs and the application program are recorded in the USB device 20. In one embodiment, the memory 22 may be random access memory (RAM).

In the embodiment, the boot loader, the kernel1, and the kernel2 of the booting file 100 are the same as contents of the firmware 10. The initrd1 and the initrd2 have some changes from contents of the firmware 10. By recording the seven parts of the booting file 100 in the flash memory 24, the first burning module 122 completes a process of burning the firmware 10 to the embedded device 2.

When the first burning module 122 records the boot loader, the kernel1, the kernel2, the initrd1, and the initrd2 of the booting file 100 in the flash memory 24, the start module 124 starts the embedded device 2, and starts the boot loader, the kernel1, and the initrd1 in sequence. In the embodiment, the initrd1 includes an identification script for indentifying the type of the USB device 20 that the embedded device 2 supports. After the initrd1 is started, the identification script identifies the USB device 20, and detects whether the rootfs and the application program are recorded in the USB 20. If the rootfs and the application program are recorded in the USB device 20, the obtaining module 126 downloads the rootfs and the application program from the USB device 20.

The detection module 128 detects whether a current register of the flash memory 24 is enabled (i.e., a ability of reading or writing data) using the flash tool 26. If the current register is enabled, the second burning module 130 burns the rootfs and the application program to the current register of the flash memory 24. If the current register is disabled, the second burning module 130 burns the rootfs and the application program to a next register of the flash memory 24.

Figure 4:
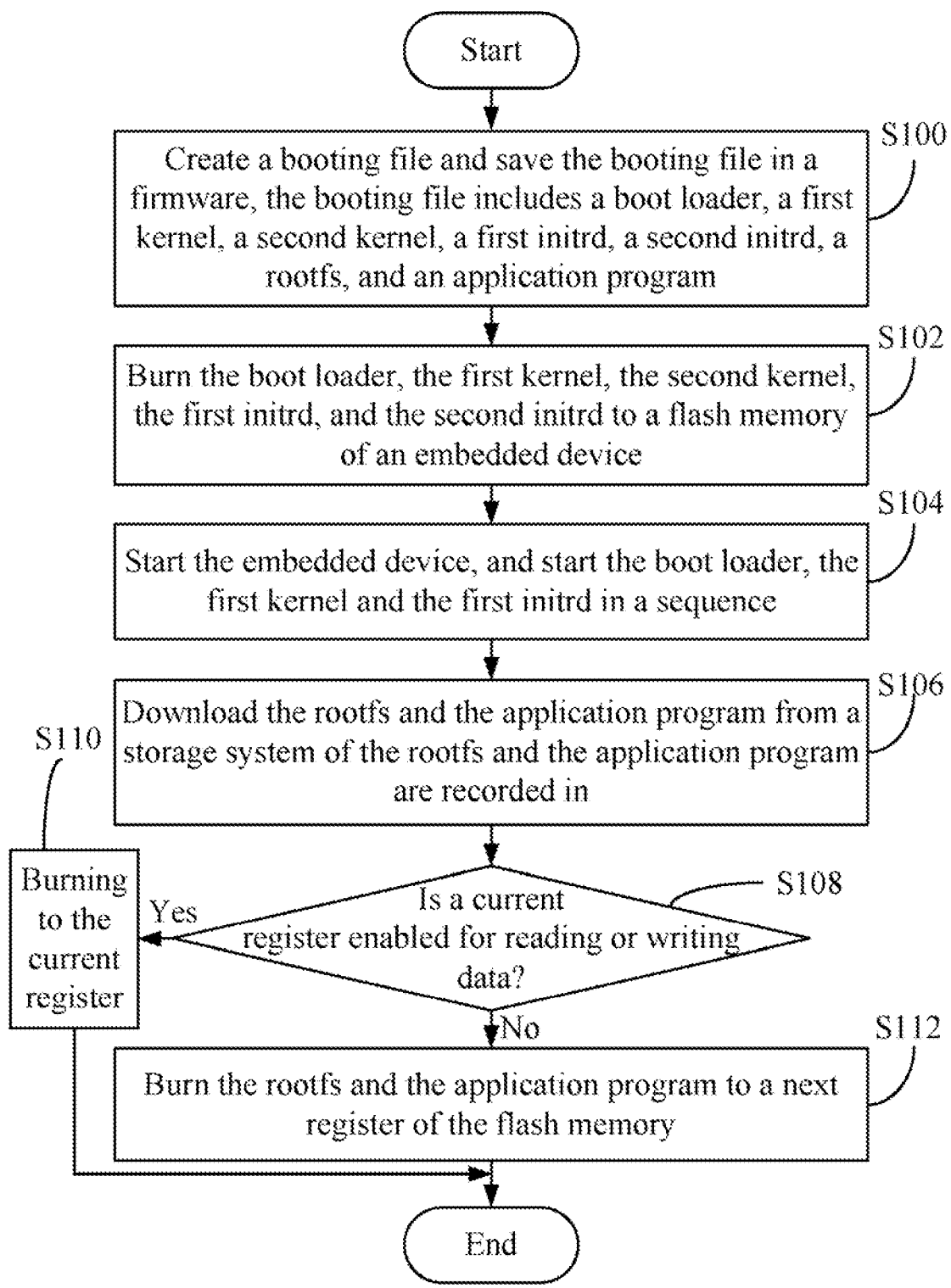
FIG. 4 is a flowchart illustrating one embodiment of a method for burning a firmware to an embedded device using the electronic device of FIG. 1.

FIG. 4 is a flowchart illustrating one embodiment of a method for burning the firmware 10 to an embedded device 2 using the electronic device 1.

In step S100, the file creation module 120 creates a booting file 100, and saves the booting file 100 to the firmware 10. Referring to FIG. 3, the booting file 100 may include seven parts: kernel1, kernel2, initrd1, initrd2, rootfs, and an application program.

As shown in FIG. 3, the file creation module 120 creates the booting file 100 according to the following steps: step B1, the file creation module 120 creates the boot loader; step B2, the file creation module 120 creates the kernel1, the kernel1 is a kernel for the embedded device 2 running a first time, the kernel1 records service supports of burning the firmware 10 (namely functions can be taken during burning the firmware 10); step B3, the file creation module 120 creates the kernel2, the kernel2 is a kernel for the embedded device 2 running except for the first time, the kernel2 includes a identification script; step B4, the file creation module 120 creates the initrd1, the initrd1 is an init ramfs recorded in a RAM of the embedded device 2 during the process of burning the firmware 10; step B5, the file creation module 120 creates the initrd2, the initrd2 is an init ramfs recorded in the RAM during the embedded device 2 running except for the first time; step B6, the file creation module 120 creates the rootfs; and step B7, the file creation module 120 creates the application program, which is used for testing the embedded device 2.

In the embodiment, the boot loader, the kernel1, and the kernel2 of the booting file 100 are the same as contents of the firmware 10. By recording the seven parts in the flash memory 24, the first burning module 122 completes a process of burning the firmware 10 to the embedded device 2.

In step S102, the first burning module 122 burns the boot loader, the kernel1, the kernel2, the initrd1, and the initrd2 of the booting file 100 to the flash memory 24.

In step S104, the start module 124 starts the embedded device 2, and starts the boot loader, the kernel1, and the initrd1 in a sequence. In the embodiment, the initrd1 includes the identification script for indentifying the type of the USB device 20 that the embedded device 2 supports. The identification script is used for identifying the USB device 20, and detecting whether the rootfs and the application program are recorded in the USB device 20.

If the rootfs and the application program are recorded in the USB device 20, in step S106, the obtaining module 126 downloads the rootfs and the application program from the USB device 20.

In step S108, the detection module 128 uses the flash tool 26 to detect whether a current register of the flash memory 24 is enabled for reading or writing data. If the current register is enabled for reading or writing data, step S110 is implemented. If the current register is disabled for reading or writing data, the flow goes to step S112.

In step S110, the second burning module 130 burns the rootfs and the application program to the current register of the flash memory 24.

In step S112, the second burning module 130 burns the rootfs and the application program to a next register of the flash memory 24.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method of burning a firmware to an embedded device, the method comprising steps of:
   creating a booting file comprising:
      creating a boot loader;
      creating a first kernel that is a kernel for the embedded device running a first time, the first kernel comprising service supports of burning the firmware;
      creating a second kernel that is a kernel for the embedded device running except for the first time, the second kernel comprising the identification script;
      creating a first initial RAM disk that is an initramfs recorded in a random access memory of the embedded device during the process of burning the firmware to the embedded device;
      creating a second initial RAM disk that is an initramfs recorded in the random access memory during the embedded device running except for the first time;
      creating a root file system; and
      creating an application program;
   saving the booting file in the firmware, the booting file comprising the boot loader, the first kernel, the second kernel, the first initial RAM disk, the second initial RAM disk of a firmware, the root file system, and the application program that tests the embedded device;
   burning the boot loader, the first kernel, the second kernel, the first initial RAM disk, and the second initial RAM disk to a flash memory of the embedded device;
   starting the embedded device, and starting the boot loader, the first kernel, and the first initial RAM disk in sequence;
   detecting whether the root file system and the application program are recorded in a storage system of the embedded device using an identification script of the first initial RAM disk;
   downloading the root file system and the application program from the storage system if the root file system and the application program are recorded in the storage system; and
   burning the root file system and the application program to the flash memory of the embedded device.

2. The method as described in claim 1, further comprising:
   saving the booting loader, the first kernel, the second kernel, the first initial RAM disk and the second initial RAM disk in a random access memory of the embedded device.

3. The method as described in claim 1, further comprising:
   saving the root file system and the application program in the storage system of the embedded device.

4. The method as described in claim 3, wherein the storage system is a universal serial bus (USB) device.

5. The method as described in claim 1, wherein the flash memory is a NAND flash.

6. The method as described in claim 1, further comprising:
   detecting whether a current register of the flash memory is enabling for reading or writing data using a flash tool;
   burning the root file system and the application program to a current register of the flash memory, if the current register is enabled for reading and writing data; or burning the root file system and the application program to a next register of the flash memory, if the current register is disable for reading and writing data.

7. An electronic device, comprising:
at least one processor;
a storage device; and
one or more modules that are stored in the storage device and executed by the at least one processor, the one or more modules comprising:
a file creation module that creates a booting file by creating a boot loader, creating a first kernel that is a kernel for the embedded device running a first time, the first kernel comprising service supports of burning the firmware, creating a second kernel that is a kernel for the embedded device running except for the first time, the second kernel comprising the identification script, creating a first initial RAM disk that is an initramfs recorded in a random access memory of the embedded device during the process of burning the firmware to the embedded device, creating a second initial RAM disk that is an initramfs recorded in the random access memory during the embedded device running except for the first time, creating a root file system, and creating an application program; and saving the booting file in the firmware, the booting file comprising the boot loader, the first kernel, the second kernel, the first initial RAM disk, the second initial RAM disk of a firmware, the root file system, and the application program that tests the embedded device;
a first burning module that burns the boot loader, the first kernel, the second kernel, the first initial RAM disk, and the second initial RAM disk to a flash memory of the embedded device;
a start module that starts the embedded device, and starts the boot loader, the first kernel, and the first initial RAM disk in sequence;
an obtaining module that detects whether the root file system and the application program are recorded in a storage system of the embedded device using an identification script of the first initial RAM disk, downloads the root file system and the application program from the storage system if the root file system and the application program are recorded in the storage system;
a second burning module that burns the root file system and the application program to the flash memory of the embedded device.

8. The electronic device as described in claim 7, wherein the first burning module further saves booting loader, the first kernel, the second kernel, the first initial RAM disk and the second initial RAM disk in a random access memory of the embedded device.

9. The electronic device as described in claim 7, wherein the second burning module further saves the root file system and the application program in the storage system of the embedded device.

10. The electronic device as described in claim 9, wherein the storage system is a universal serial bus device, and the flash memory is a NAND flash.

11. The electronic device as described in claim 7, further comprising:
a detection module that detects a current register of the flash memory is enabling for reading or writing data using a flash tool.

12. The electronic device as described in claim 11, wherein the second burning module burns the root file system and the application program to a current register of the flash memory if the current register is enabled for reading and writing data, and burns the root file system and the application program to a next register of the flash memory if the current register is disable for reading and writing data.

13. A non-transitory computer readable storage medium having stored thereon instructions that, when executed by a processor of an electronic device, causes the electronic device to perform a method of burning a firmware in an embedded device, the method comprising steps of:
creating a booting file comprising:
creating a boot loader;
creating a first kernel that is a kernel for the embedded device running a first time, the first kernel comprising service supports of burning the firmware;
creating a second kernel that is a kernel for the embedded device running except for the first time, the second kernel comprising the identification script;
creating a first initial RAM disk that is an initramfs recorded in a random access memory of the embedded device during the process of burning the firmware to the embedded device;
creating a second initial RAM disk that is an initramfs recorded in the random access memory during the embedded device running except for the first time;
creating a root file system; and
creating an application program;
saving the booting file in the firmware, the booting file comprising the boot loader, the first kernel, the second kernel, the first initial RAM disk, the second initial RAM disk of a firmware, the root file system, and the application program that tests the embedded device;
burning the boot loader, the first kernel, the second kernel, the first initial RAM disk, and the second initial RAM disk to a flash memory of the embedded device;
starting the embedded device, and starting the boot loader, the first kernel, and the first initial RAM disk in sequence;
detecting whether the root file system and the application program are recorded in a storage system of the embedded device using an identification script of the first initial RAM disk;
downloading the root file system and the application program from the storage system if the root file system and the application program are recorded in the storage system; and
burning the root file system and the application program to the flash memory of the embedded device.

14. The storage medium as described in claim 13, wherein the method further comprises:
saving the booting loader, the first kernel, the second kernel, the first initial RAM disk and the second initial RAM disk in a random access memory of the embedded device.

15. The storage medium as described in claim 13, wherein the method further comprises:
saving the root file system and the application program in the storage system of the embedded device.

16. The storage medium as described in claim 13, wherein the storage system is a universal serial bus device, and the flash memory is a NAND flash.

17. The storage medium as described in claim 13, wherein the method further comprises:
detecting whether a current register of the flash memory is enabling for reading or writing data using a flash tool;
burning the root file system and the application program to a current register of the flash memory, if the current register is enabled for reading and writing data; or burning the root file system and the application program to a next register of the flash memory, if the current register is disable for reading and writing data.

\* \* \* \* \*